United States Patent [19]

Silver et al.

[11] 4,375,577

[45] Mar. 1, 1983

[54] STOP JOINT ASSEMBLY FOR PRESSURIZED LAMINAR DIELECTRIC CABLE

[75] Inventors: David A. Silver, Livingston; Attila F. Dima; George W. Seman, both of Piscataway, all of N.J.

[73] Assignee: Pirelli Cable Corporation, Union, N.J.

[21] Appl. No.: 222,639

[22] Filed: Jan. 5, 1981

[51] Int. Cl.³ ............................................ H02G 15/25
[52] U.S. Cl. ................................ 174/22 R; 174/73 R
[58] Field of Search ............... 174/19, 20, 21 R, 21 C, 174/22 R, 22 C, 73 R, 75 D

[56] References Cited

U.S. PATENT DOCUMENTS 4,104,479  8/1978  Bahder et al. ..................... 174/22 R

*Primary Examiner*—Laramie E. Askin

*Attorney, Agent, or Firm*—Brooks, Haidt, Haffner & Delahunty

[57] ABSTRACT

A stop joint for a pair of electric cables having fluid under pressure therein in which the fluid impermeable pipe or shield around the cable, which is spaced at its end from the bared conductor end to expose the cable insulation, is connected to the connector for interconnecting the cable ends by a multi-part stop tube having an intermediate portion of insulating material and a pair of end portions bonded to respective ends of the intermediate portion, the end portions being made of an insulating material rendered conductive by the addition of conductive material or of insulating material having a conductive layer thereon for forming electrodes for electrical stress distribution purposes. The electrodes have substantially the same coefficient of expansion as the material of the intermediate tube portion to prevent separation of the end portions from the intermediate portion with temperature changes.

19 Claims, 5 Drawing Figures

FIG. 1.
FIG. 2.
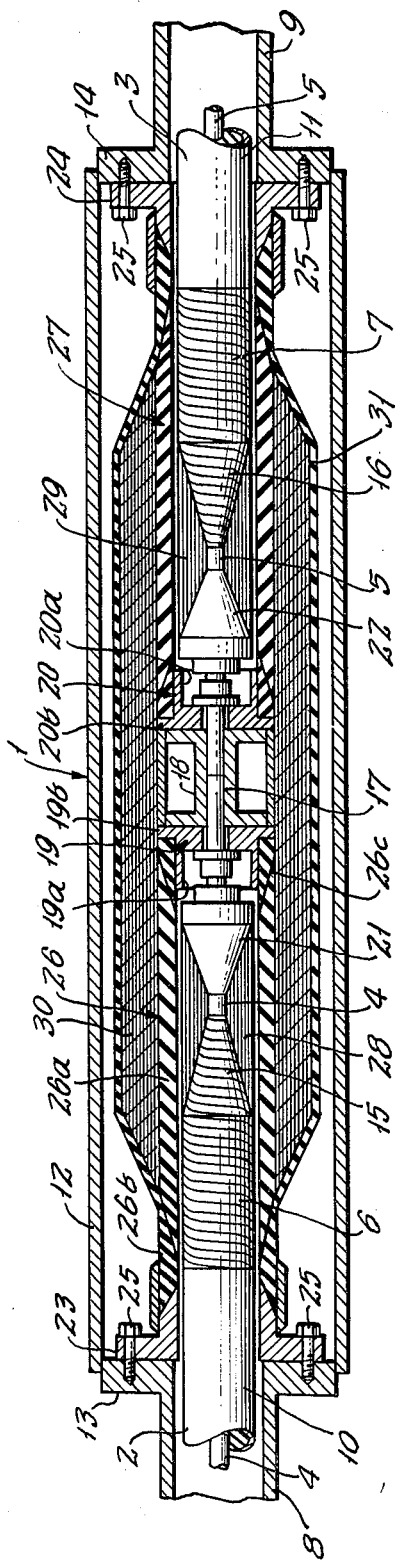
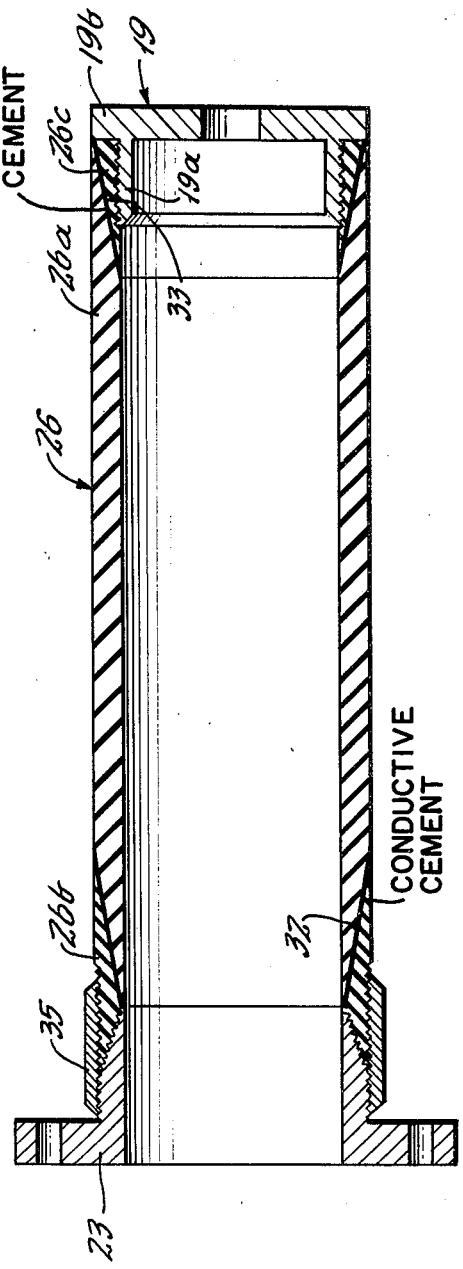

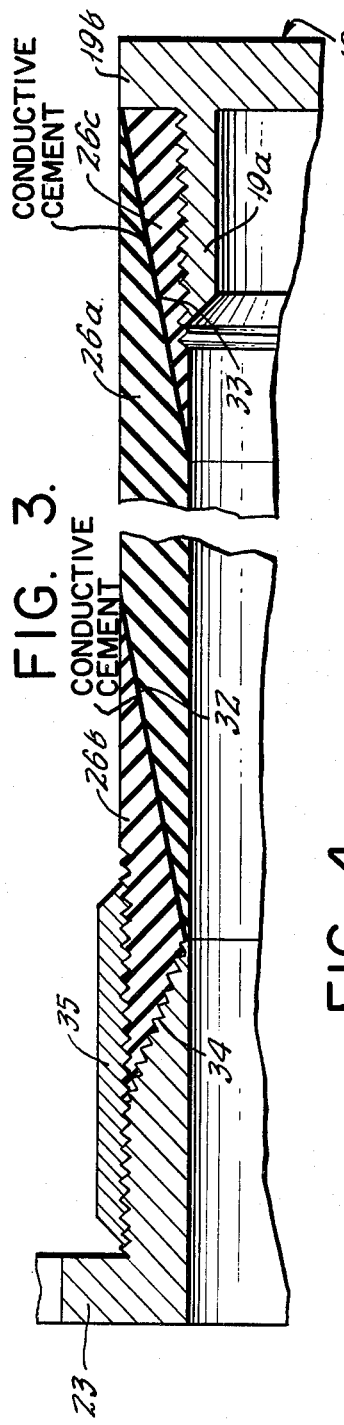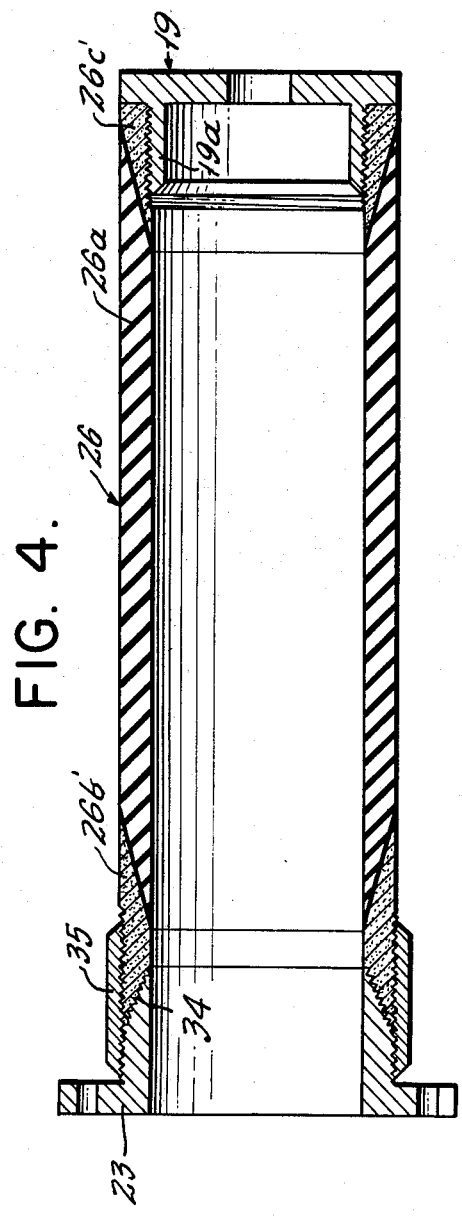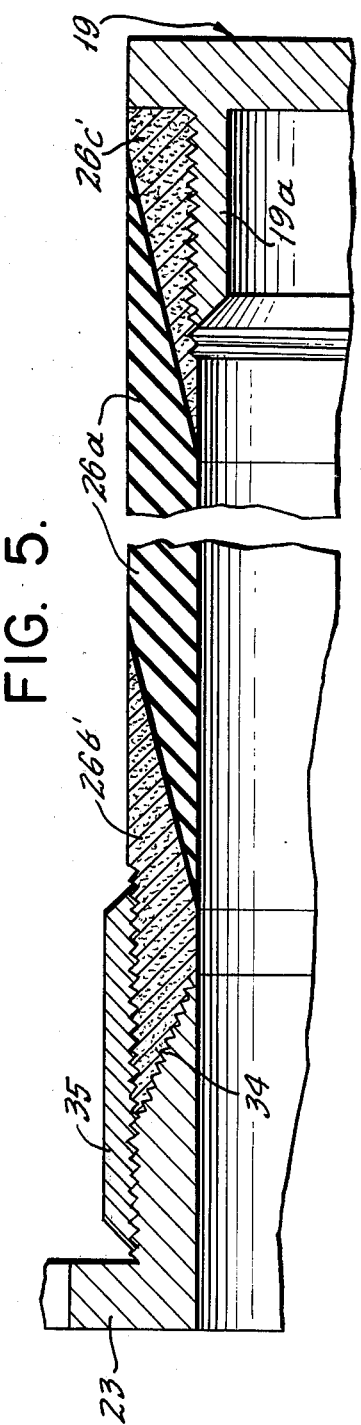

STOP JOINT ASSEMBLY FOR PRESSURIZED LAMINAR DIELECTRIC CABLE

This invention relates to the structure of electric cable joints and particularly to the electrodes in such joints which are employed to provide a desired electric field distribution.

Electric cables are joined to each other at adjacent ends by what is known as joints. In such joints, the conductors of the cables are conductively joined, and the so-joined conductors, as well as any connecting elements are covered with insulation. The shielding of the cables, if used, is also conductively joined at the joint, and various conductive elements usually are included in the joint to provide a desired electric stress gradient. Such joints are subjected to substantially the same electrical, mechanical and thermal conditions as the cables themselves. Examples of prior art joints are disclosed in U.S. Pat. No. 4,104,479 and the patents cited in connection with the application for such patent.

The joints with which the invention is primarily concerned are used with fluid-filled, cables, such as high pressure, oil filled (HPOF) cables or medium pressure, oil filled (MPOF) cables. Such latter cables have a central conductor, oil filled insulation and an outer sheath and the oil flows longitudinally of the cable. In a broad sense, there are two types of joints for such cables known as normal or through joints and stop joints. Normal joints are used mainly to interconnect two similar types cables both electrically and hydraulically. Stop joints are used to interconnect two cables electrically but so as to prevent fluid flow therebetween. Stop joints are used on cables having different types of pressurizing media (e.g. oil and gas) or different working pressures. They are also used for sectionalizing cables of the same pressurizing media to reduce pressures caused by differences in elevation along the cable route and for hydraulically isolating sections of cable at essentially the same elevation.

When the ends of two cables are to be joined, the outer sheath is cut back on the two cables to expose the insulation, and a hollow, cylindrical tube, called a stop tube, which is impermeable to oil is applied over the insulation of each cable. The stop tube is made of an insulating material, such as procelain or a resin-based material reinforced with fiber, paper or other suitable materials.

Each stop tube engages an electrode at each of its ends, one electrode at one end being a low voltage electrode and the other electrode at the other end being a high voltage electrode. Normally these electrodes serve two purposes. One is to reduce the electrical field at the transition points to a safe level. The other is to complete the hydraulic barrier around the cable insulation. In accordance with the present state of the art, the electrodes are made of non-magnetic metal having a coefficient of thermal expansion similar to that of the stop tube. However, this severely limits the selection of suitable stop tube materials since, if the difference of the coefficients of thermal expansion of the electrodes and stop tube material are significant, separation will occur at the bonded surface between the electrodes and the stop tube which interrupts the hydraulic barrier.

One object of the invention is to provide sealing means for the ends of a stop tube in a cable joint which eliminates the problems associated with differences in coefficients of expansion between the electrodes and the stop tube.

In accordance with one embodiment of the invention, the stop tube and each electrode are made of the same basic material and have matching surfaces extending transversely to the axis of the tube. The tube and the electrodes are cemented together at such surfaces by a conductive cement itself forming part of the electrodes so that, in effect, there is a two part stop tube with the parts thereof held together by a layer of conductive adhesive. The surfaces, and hence, the layer, are shaped to provide the desired electrical field distribution.

In accordance with another embodiment of the invention, the electrodes are made of a combination of insulating material and conductive material having substantially the same coefficient of expansion as the material of the stop tube. The electrodes may be made of the same material as is used in the stop tube except for the addition of conductive materials, such as carbon black or metal particles, which render the electrodes sufficiently conductive to perform its electrical functions.

Other objects and advantages of the present invention will be apparent from the following detailed description of the presently preferred embodiments thereof, which description should be considered in conjunction with the accompanying drawings in which:

FIG. 1 is a longitudinal, cross-sectional view of a stop joint incorporating the invention;

FIG. 2 is an enlarged, cross-sectional view of the stop tube and electrodes forming part of the joint shown in FIG. 1;

FIG. 3 is an enlarged, fragmentary, cross-sectional view of the stop tube and electrodes shown in FIG. 2;

FIG. 4 is a cross-sectional view of an alternative embodiment of a stop tube and electrodes; and FIG. 5 is an enlarged, fragmentary, cross-sectional view of the stop tube and electrodes shown in FIG. 4.

Although the invention will be described in connection with a stop joint for pipe type cables, it will be apparent to those skilled in the art that the principles of the invention are applicable to other types of joints and to other types of cables.

FIG. 1 shows a stop joint 1 located between a first length of cable 2 and a second length of cable 3. Both cables are shown as laminar dielectric cables which have conductors 4 and 5, respectively, insulated with tape which is wrapped in successive overlapping layers, indicated by the reference numerals 6 and 7.

The cables 2 and 3 are enclosed, respectively, in pipes 8 and 9. The insulating tape layers 6 and 7 are, respectively, surrounded by fluid impermeable metal shields 10 and 11 and are impregnated with a fluid, such as oil, under pressure. If desired, the pipes 8 and 9 may be filled with a fluid, such as oil, under pressure, in which event, the metal shields 10 and 11 may, if desired, be omitted.

The conductors 4 and 5 are connected together in the stop joint 1, and the stop joint illustrated in FIG. 1 is constructed for use with cables of the same type, that is, pipe type, but it will be understood that stop joints are also used between cables of different types.

The stop joint has an outer casing 12, usually referred to as the joint casing, and this casing 12 is secured at one end to a circular flange 13 which is at the end of the pipe 8. The other end of the casing 12 is secured to a flange 14 at the end of the pipe 9. The casing 12 is connected with the flanges 13 and 14 by welding, but it will be understood that any other kind of fluid-tight connection can be used which has the necessary strength.

Portions of the insulation 6 and 7 are removed from the cables 2 and 3 so as to make the insulation become progressively thinner for a portion of the length of the cables, and insulation treated in this manner is commonly referred to as "pencilled". These pencilled portions of the insulation of the cables 2 and 3 are designated in FIG. 1 by the reference characters 15 and 16, respectively.

At the end of the tapered or pencilled sections 15 and 16, the conductors 4 and 5, respectively, are bare. The bare ends of the conductors 4 and 5 extend into opposite ends of a connector 17 of the type described in U.S. Pat. No. 4,104,479. A spool-like, metal member 18 surrounds the connector 17, and a pair of metal members 19 and 20, each having a hollow cylindrical portion, 19a and 20a, and a flange, 19b and 20b, are secured to opposite ends of the member 18. The connector 17 is secured to the members 19 and 20, and the connector 17 in combination with the members 18-20 form means for conductively connecting the end of the conductor 4 with the end of the conductor 5.

A pair of electrodes 21 and 22 fit over the conductors 4 and 5, respectively, between the pencilled portions 15 and 16 and the connector 17 for the purpose described in said U.S. Pat. No. 4,104,479. The electrodes 21 and 22 preferably have a press fit on the respective conductors.

A pair of hollow, cylindrical metal members 23 and 24 are secured, in fluid-tight relation, to the flanges 13 and 14, respectively, such as by screws 25. A multi-part stop tube 26 of fluid impermeable material is intermediate the member 19 and the member 23 and is secured at one end, in fluid-tight relation to the member 23 and at it opposite end, in fluid-tight relation to the member 19. A multi-part stop tube 27 is intermediate the member 20 and the member 24 and is secured, at one end, in fluid-tight relation to the member 24 and, at its opposite end, in fluid-tight relation to the member 20. At least the central portion of each tube 26 and 27 is made of insulating material, and each tube 26 and 27 surrounds at least the exposed portion of the insulation 6 or 7 therewithin. With cables 2 and 3 of the type illustrated, the member 23 could be secured in fluid-tight relation to the metal shield 10 in addition to, or instead of, the fluid-tight seal with the flange 13, and the member 24 could be secured in fluid-tight relation to the metal shield 11 in addition to, or instead of, the fluid-tight seal with the flange 14.

The pencilled portions 15 and 16 of the insulation of the cables 2 and 3, the portion of the conductors 4 and 5 intermediate the electrodes 21 and 22 and the pencilled portions 16 and 17 and the conical surfaces of the electrodes 21 and 22 are covered by wrappings 28 and 29 of insulating tape. The tubes 26 and 27 and the connecting means for the conductors 4 and 5 are also covered with a wrapping 30 of insulating tape. The wrapping 30 preferably is covered with a layer 31 of conductive material which is conductively connected at its ends to the metal shields 10 and 11.

FIGS. 2 and 3 illustrate a stop tube 26 of the invention in conjunction with the members 19 and 23, FIG. 3 illustrating only a part of the tube 26 and such members. Stop tube 27 has the same construction as the stop tube 26.

The central portion 26a of the tube 26 is made of an insulating material conventionally used for a stop tube. For example, the central portion 26a may be made of porcelain or a resin-based material reinforced with fiber, paper or other suitable materials. The tube 26 also has a pair of end portions 26b and 26c which are made of a material having a coefficient of expansion substantially the same as the coefficient of expansion of the material of the central portion 26a. While the end portions 26b and 26c may be made of a material which is different from the material from which the central portion 26a is made, they may also be made from the material used to make the central portion 26a. The end portions 26b and 26c are bonded to the central portion 26a by conductive cement layers 32 and 33 which form parts of the end portions and which extend at an acute angle to the axis of the tube 26. The abutting surfaces of the portion 26a and the portions 26b and 26c are frusto-conical, and in effect, the portions 26b and 26c with the conductive cement are electrodes with frusto-conical conductive surfaces only. The conductive cement layer of the portion 26b contacts the member 23, and the conductive cement layer 33 of the portion 26c contacts the member 19 so that the respective layers of cement are at the electrical potential of the adjacent member 23 or 19.

The conductive cement layers 32 and 33 control the electrical stress at the transition points and shield the irregular conductive members adjacent thereto thereby improving the electrical characteristics of the joint. Since the portions 26b and 26c have substantially the same coefficient of expansion as the central portion 26a, the portions are not subjected to thermal stresses, during service of the cables, which tend to separate the portions and thereby cause fluid leakage paths.

Because the end of the stop tube 26 which engages the member 23 is outside the electrical field and because the other end of the tube 26 which engages the member 19 is shielded by the conductive cement layer 33, the ends of the tube 26 may be secured to the respective members in fluid-tight relation thereto by any suitable means, even if irregular in shape, which will prevent separation between the tube 26 and the members 19 and 23 under thermal stress. In other words, the manner of sealing the ends of the tube 26 to the members 19 and 23 does not influence the electric field, and therefore, even if the portions 26b and 26c are made of a material having a coefficient of expansion different from that of the materials of the members 19 and 23, there are ways of securing the ends of the tube 26 to the members 19 and 23 which will prevent separation between the ends and the members due to operating temperature conditions.

For example, the abutting surfaces of the portion 26b and the member 23 may be provided with interfitting grooves and ridges 34 (FIG. 3), and the surfaces may be held together by a metal reinforcing sleeve 35 which has internal threads which engage threads on the portion 26b and the member 23 as shown in FIG. 3. Similarly, the portion 26c may have internal threads which engage threads on the cylindrical portion 19a as shown in FIG. 3. If desired, the portion 26b may be secured to the member 23 in the same manner that the portion 26c is secured to the member 19. If necessary, suitable gaskets may be interposed between the various parts.

FIGS. 4 and 5 illustrate an embodiment of the stop tube which is the same as the stop tube embodiment illustrated in the preceding figures except that the stop tube portions 26a' and 26c' are conductive throughout and are bonded to the central portion 26a by a cement which may be either conducting or non-conducting. For example, the portions 26a' and 26c' may be made of a material which is essentially the same as the material employed for the central portion 26a with the addition of carbon black or metal particles or other conductive material in an amount sufficient to render the portions 26b' and 26c' conductive throughout and act as electrodes which perform the functions of the conductive layers 32 and 33. Such electrode portions 26b' and 26c' can be bonded to the central portion 26a during the manufacture of the stop tube 26, e.g. prior to the final curing thereof when the tube 26 comprises a resin material, or after the central portion 26a has been completed, by bonding the portions 26b' and 26c' thereto with a cement, preferably, a conductive cement.

In the embodiments of the stop tube described, the stop tube comprises a fluid impermeable, intermediate tube 26a of insulating material having conductive frusto-conical electrodes bonded thereto at its ends, and the electrodes are respectively secured in fluid-tight relation to one of a pair of members 19 and 23, one member, member 19, being secured in fluid-tight relation to the means for connecting the cable conductors together and the other member, member 23, being secured in fluid-tight relation to a fluid-impermeable metal tube 8 or 10 enclosing a cable. In one embodiment, the electrodes which include conductive cement are connected to the members by rings which are made of the same material as the intermediate tube and which have frusto-conical surfaces on which the cement is applied, and in the other embodiment, such rings are conductive throughout and form both the electrodes and the means for connecting the intermediate tube to the members. Obviously, a combination of the two embodiments may be used, that is, one end of the intermediate tube 26a may be connected to a member as shown in FIGS. 2 and 3 using a conductive cement layer electrode 32 or 33 and the other end of the tube 26a may be connected to the other member as shown in FIGS. 4 and 5 using a conductive ring. When the rings 26b and 26c or 26b' and 26c' are assembled with the tube 26a, the entire unit may be considered to be a stop tube. As used in the claims set forth hereinafter, the term "electrode" refers to either the combination of an insulating ring 26b or 26c with the conductive cement layer 32 or 33 shown in FIGS. 2 and 3 or a conductive ring 26b' or 26c' shown in FIGS. 4 and 5.

Of course, if one of the cables 2 or 3 is connected to the connecting means for the cable conductors in a manner which does not require a stop tube or if one of the cables 2 or 3 is of a type which does not require a stop tube, then the joint 1 may include only one stop tube associated with only one of the cables.

It will be observed from FIG. 1 that the electrodes 21 and 22, which are made of metal, have outer, frusto-conical surfaces with their bases nearer the connecting means than the remainder thereof and that such electrodes 21 and 22 are disposed so that such outer surfaces form, in effect, extensions of the frusto-conical surfaces of the stop tube electrodes which are nearer to the connecting means.

Although preferred embodiments of the present invention have been described and illustrated, it will be apparent to those skilled in the art that various modifications may be made without departing from the principles of the invention.

What is claimed is:

1. An electric cable joint comprising a cable having a core including a conductor surrounded by insulation, and having fluid impermeable means around said insulation but spaced at one end from the end of the conductor so as to expose said insulation, and fluid under pressure within said fluid impermeable means, said joint further comprising:

first connecting means conductively connected to the end of said conductor for connecting said conductor to the conductor of another cable;

a fluid impermeable tube of insulating material intermediate said first connecting means and said end of said fluid impermeable means and around the exposed insulation, said tube having a peripherally extending surface at the end thereof nearer said first connecting means which extends at an acute angle to the axis of said tube;

an electrode intermediate said first connecting means and said end of said tube and having a fluid tight connection with both said first connecting means and said end of said tube, said electrode being made of a material having a coefficient of expansion substantially the same as the coefficient of expansion of the material of said tube and having a surface adjacent said end of said tube which has a shape corresponding to the shape of said surface at said end of said tube and said electrode comprising insulating material but having conductive material at least at said surface thereof which is conductively connected to said first connecting means for modifying the electric field at said conductor end and which engages said surface at said end of said tube; and second connecting means providing a fluid-tight connection between the other end of said tube and said fluid impermeable means around the insulation of said cable.

2. A joint as set forth in claim 1 wherein said surface at said end of said tube is frusto-conical and has its base nearer to said first connecting means than the remainder thereof.

3. A joint as set forth in claim 1 or 2 wherein said conductive material extends around at least a portion of said first connecting means.

4. A joint as set forth in claim 3 further comprising a further electrode within said tube and conductively connected to said first-mentioned conductor, said further electrode also having a frusto-conical surface and said further electrode being disposed with the base of the frusto-conical surface thereof nearer said first connecting means than the remainder thereof.

5. A joint as set forth in claim 4 wherein said further electrode is also disposed so that its frusto-conical surface is aligned with the frusto-conical surface at said first-mentioned end of said tube.

6. A joint as set forth in claim 1 wherein said insulating material of said electrode has said conductive material throughout.

7. A joint as set forth in claim 1 wherein said second connecting means comprises a further electrode around said first-mentioned cable and intermediate said other end of said tube and said fluid impermeable means around the insulation of said cable, said other end of said tube having a peripherally extending surface which extends at an acute angle to the axis of said tube and said further electrode being made of a material having a coefficient of expansion substantially the same as the coefficient of expansion of the material of said tube and having a surface adjacent said other end of said tube which has a shape corresponding to the shape of said surface at said other end of said tube and said further electrode comprising insulating material but having conductive material at least at said surface thereof which is conductively connected to said fluid impermeable means which is also conductive, said conductive material also engaging said surface of said other end of said tube.

8. A joint as set forth in claim 7 wherein said surface of said other end of said tube is frusto-conical and has its base nearer to said first connecting means than the remainder thereof.

9. A joint as set forth in claim 7 or 8 wherein the insulating material of said further electrode has said conductive material throughout.

10. An electric cable joint comprising a cable having a core including a conductor surrounded by insulation, and having fluid impermeable means around said insulation but spaced at one end from the end of the conductor so as to expose said insulation, and fluid under pressure within said fluid impermeable means, said joint further comprising:
   first connecting means conductively connected to the end of said conductor for connecting said conductor to the conductor of another cable;
   a fluid impermeable tube of insulating material intermediate said first connecting means and said end of said fluid impermeable means and around the exposed insulation, said tube having a peripherally extending surface at the end thereof nearer said first connecting means which extends at an acute angle to the axis of said tube;
   an electrode intermediate said first connecting means and said end of said tube and having a fluid tight connection with both said first connecting means and said end of said tube, said electrode being made of a material having a coefficient of expansion substantially the same as the coefficient of expansion of the material of said tube and having a surface adjacent said end of said tube which has a shape corresponding to the shape of said surface at said end of said tube and said electrode having a layer of conductive cement at said surface thereof which bonds said electrode to said end of said tube, which is conductively connected to said first connecting means for modifying the electric field at said conductor end and which engages said surface at said end of said tube; and
   second connecting means providing a fluid-tight connection between the other end of said tube and said fluid impermeable means around the insulation of said cable.

11. A joint as set forth in claim 10, wherein the material of said electrode is substantially the same as the material of said tube except for the addition of said layer of conductive cement.

12. An electric cable joint comprising a cable having a core including a conductor surrounded by insulation, and having fluid impermeable means around said insulation but spaced at one end from the end of the conductor so as to expose said insulation, and fluid under pressure within said fluid impermeable means, said joint further comprising:
   first connecting means conductively connected to the end of said conductor for connecting said conductor to the conductor of another cable;
   a fluid impermeable tube of insulating material intermediate said first connecting means and said end of said fluid impermeable means and around the exposed insulation, said tube having a peripherally extending surface at the end thereof nearer said first connecting means which extends at an acute angle to the axis of said tube;
   a conductive electrode intermediate said first connecting means and said end of said tube and having a fluid tight connection with both said first connecting means and said end of said tube, said electrode being made of a material having a coefficient of expansion substantially the same as the coefficient of expansion of the material of said tube and having a surface adjacent said end of said tube which has a shape corresponding to the shape of said surface at said end of said tube and said electrode being conductively connected to said first connecting means for modifying the electric field at said conductor end and engaging said surface at said end of said tube, the material of said electrode being substantially the same as the material of said tube except for the addition of conductive material; and
   second connecting means providing a fluid-tight connection between the other end of said tube and said fluid impermeable means around the insulation of said cable.

13. An electric cable joint comprising a cable having a core including a conductor surrounded by insulation, and having fluid impermeable means around said insulation but spaced at one end from the end of the conductor so as to expose said insulation, and fluid under pressure within said fluid impermeable means, said joint further comprising:
   first connecting means conductively connected to the end of said conductor for connecting said conductor to the conductor of another cable;
   a fluid impermeable tube of insulating material intermediate said first connecting means and said end of said fluid impermeable means and around the exposed insulation, said tube having a peripherally extending surface at the end thereof nearer said first connecting means which extends at an acute angle to the axis of said tube;
   an electrode intermediate said first connecting means and said end of said tube and having a fluid tight connection with both said first connecting means and said end of said tube, said electrode being secured to said first connecting means by interengaging threads on said electrode and on said first connecting means and said electrode being made of a material having a coefficient of expansion substantially the same as the coefficient of expansion of the material of said tube and having a surface adjacent said end of said tube which has a shape corresponding to the shape of said surface at said end of said tube and said electrode having conductive material at least at said surface thereof which is conductively connected to said first connecting means for modifying the electric field at said conductor end and which engages said surface at said end of said tube; and
   second connecting means providing a fluid-tight connection between the other end of said tube and said fluid impermeable means around the insulation of said cable.

14. An electric cable joint comprising a cable having a core including a conductor surrounded by insulation, and having fluid impermeable means around said insulation but spaced at one end from the end of the conductor so as to expose said insulation, and fluid under pressure within said fluid impermeable means, said joint further comprising:

first connecting means conductively connected to the end of said conductor for connecting said conductor to the conductor of another cable;

a fluid impermeable tube of insulating material intermediate said first connecting means and said end of said fluid impermeable means and around the exposed insulation, said tube having a peripherally extending surface at the end thereof nearer said first connecting means which extends at an acute angle to the axis of said tube;

an electrode intermediate said first connecting means and said end of said tube and having a fluid tight connection with both said first connecting means and said end of said tube, said electrode being made of a material having a coefficient of expansion substantially the same as the coefficient of expansion of the material of said tube and having a surface adjacent said end of said tube which has a shape corresponding to the shape of said surface at said end of said tube and said electrode having conductive material at least at said surface thereof which is conductively connected to said first connecting means for modifying the electric field at said conductor end and which engages said surface at said end of said tube; and second connecting means comprising a further electrode around said first-mentioned cable and intermediate said other end of said tube and said fluid impermeable means around the insulation of said cable, said other end of said tube having a peripherally extending surface which extends at an acute angle to the axis of said tube and said further electrode being made of a material having a coefficient of expansion substantially the same as the coefficient of expansion of the material of said tube and having a surface adjacent said other end of said tube which has a shape corresponding to the shape of said surface at said other end of said tube and said further electrode having a layer of conductive cement at said surface thereof which bonds said further electrode to said other end of said tube which is conductively connected to said fluid impermeable means which is also conductive.

15. A joint as set forth in claim 14 wherein the material of said further electrode is substantially the same as the material of said tube except for the addition of said layer of conductive cement.

16. An electric cable joint comprising a cable having a core including a conductor surrounded by insulation, and having fluid impermeable means around said insulation but spaced at one end from the end of the conductor so as to expose said insulation, and fluid under pressure within said fluid impermeable means, said joint further comprising:

first connecting means conductively connected to the end of said conductor for connecting said conductor to the conductor of another cable;

a fluid impermeable tube of insulating material intermediate said first connecting means and said end of said fluid impermeable means and around the exposed insulation, said tube having a peripherally extending surface at the end thereof nearer said first connecting means which extends at an acute angle to the axis of said tube;

an electrode intermediate said first connecting means and said end of said tube and having a fluid tight connection with both said first connecting means and said end of said tube, said electrode being made of a material having a coefficient of expansion substantially the same as the coefficient of expansion of the material of said tube and having a surface adjacent said end of said tube which has a shape corresponding to the shape of said surface at said end of said tube and said electrode having conductive material at least at said surface thereof which is conductively connected to said first connecting means for modifying the electric field at said conductor end and which engages said surface at said end of said tube; and second connecting means providing a fluid-tight connection between the other end of said tube and said fluid impermeable means around the insulation of said cable, said second connecting means comprising a further electrode around said first-mentioned cable and intermediate said other end of said tube and said fluid impermeable means around the insulation of said cable, said other end of said tube having a peripherally extending surface which extends at an acute angle to the axis of said tube and said further electrode being made of a material which is substantially the same as the material of said tube except for the addition of conductive material and having a coefficient of expansion substantially the same as the coefficient of expansion of the material of said tube and having a surface adjacent said other end of said tube which has a shape corresponding to the shape of said surface at said other end of said tube and said further electrode having conductive material at least at said surface thereof which is conductively connected to said fluid impermeable means which is also conductive, said conductive material also engaging said surface of said other end of said tube.

17. A joint as set forth in claim 16 wherein said surface of said other end of said tube is frusto-conical and has its base nearer to said first connecting means than the remainder thereof.

18. An electric cable joint comprising a cable having a core including a conductor surrounded by insulation, and having fluid impermeable means around said insulation but spaced at one end from the end of the conductor so as to expose said insulation, and fluid under pressure within said fluid impermeable means, said joint further comprising:

first connecting means conductively connected to the end of said conductor for connecting said conductor to the conductor of another cable;

a fluid impermeable tube of insulating material intermediate said first connecting means and said end of said fluid impermeable means and around the exposed insulation, said tube having a peripherally extending surface at the end thereof nearer said first connecting means which extends at an acute angle to the axis of said tube;

an electrode intermediate said first connecting means and said end of said tube and having a fluid tight connection with both said first connecting means and said end of said tube, said electrode being made of a material having a coefficient of expansion substantially the same as the coefficient of expansion of the material of said tube and having a surface adjacent said end of said tube which has a shape corresponding to the shape of said surface at said end of said tube and said electrode having conductive material at least at said surface thereof which is conductively connected to said first connecting means for modifying the electric field at said conductor end and which engages said surface at said end of said tube; and second connecting means providing a fluid-tight connection between the other end of said tube and said fluid impermeable means around the insulation of said cable, said second connecting means comprising a further electrode around said first-mentioned cable and intermediate said other end of said tube and said fluid impermeable means around the insulation of said cable, said other end of said tube having a peripherally extending surface which extends at an acute angle to the axis of said tube and said further electrode being made of a material having a coefficient of expansion substantially the same as the coefficient of expansion of the material of said tube and having a surface adjacent said other end of said tube which has a shape corresponding to the shape of said surface at said other end of said tube and said further electrode having conductive material at least at said surface thereof which is conductively connected to said fluid impermeable means which is also conductive, said conductive material also engaging said surface of said other end of said tube, and said second connecting means further comprising a hollow cylindrical member around said first-mentioned cable, said member being disposed intermediate said further electrode and said fluid impermeable means and being secured in fluid-tight relation to said further electrode and said fluid impermeable means.

19. A joint as set forth in claim 18 wherein said member is secured to said further electrode by a sleeve having threads which engage threads on said member and on said further electrode.

* * * * *